(12) United States Patent
Pandit

(10) Patent No.: US 8,821,120 B1
(45) Date of Patent: Sep. 2, 2014

(54) WIND ENERGY CONVERSION SYSTEM

(76) Inventor: Sudhir Pandit, Amity, AR (US)

( * ) Notice: Subject to any disclaimer, the term of this patent is extended or adjusted under 35 U.S.C. 154(b) by 378 days.

(21) Appl. No.: 13/427,937

(22) Filed: Mar. 23, 2012

(51) Int. Cl.
*F03D 3/02* (2006.01)
*F03D 3/06* (2006.01)

(52) U.S. Cl.
CPC *F03D 3/02* (2013.01); *F03D 3/068* (2013.01); *Y10S 415/907* (2013.01)
USPC .................. 416/17; 415/4.2; 415/907; 416/79

(58) Field of Classification Search
CPC ....................................................... F03D 5/06
USPC ............ 415/4.2, 4.4, 60, 907; 416/17, 79, 82, 416/83, 98, 100, 111, 116; 290/44, 53, 54
See application file for complete search history.

(56) References Cited

U.S. PATENT DOCUMENTS

2010/0060008 A1* 3/2010 Hostetler .......................... 290/54
2012/0171035 A1* 7/2012 Fransen .......................... 416/17

* cited by examiner

*Primary Examiner* — Ned Landrum
*Assistant Examiner* — Woody A Lee, Jr.
(74) *Attorney, Agent, or Firm* — Golf Coast Intellectual Property Group

(57) ABSTRACT

A wind energy conversion system operable to convert wind energy into either mechanical or electrical energy. The wind energy conversion system further includes a first wind panel and a second wind panel having a plurality of pivotally mounted shutters. The first wind panel and second wind panel are operably coupled to a pivot bar and traverse in a reciprocating manner being driven by the altering of position of the plurality of shutters. A support platform is further included that has support rods laterally extending therefrom operable to provide support for the first wind panel and second wind panel. A power rod is included that is operably coupled to the pivot bar and transfers the reciprocal movement of the pivot bar into rotational movement to drive a gear mounted thereon. A directional vane orients the wind energy conversion system.

20 Claims, 2 Drawing Sheets

WIND ENERGY CONVERSION SYSTEM

FIELD OF THE INVENTION

The present invention relates to an energy conversion system, more specifically but not by way of limitation but a energy conversion system that harness energy produced by the wind and converts the energy into a usable form such as but not limited to mechanical or electrical energy.

BACKGROUND

Wind energy is one of the most sustainable and accessible forms of energy on earth. Wind energy is desirable in today's economy as it is a renewable energy source that is pollution free. Additionally, there are many parts of the country that wind energy is very abundant making it an attractive power source in those areas. Another advantage of wind energy is that it is one of the lowest priced renewable energy sources. In the current political climate, wind energy offers one of the most cost effective alternatives to fossil fuels providing an alternative to our countries fossil fuel addiction and increases our energy supply diversity.

Traditional wind energy conversion systems offer high working reliability, no fuel costs and no pollution. Some of the challenges of traditional wind energy systems are the ability to manage altering wind speeds and still effectively convert wind energy to mechanical or electrical energy and a high initial investment for construction of a wind energy system. As is know in the art, the amount of energy in the wind is proportional to the cube of the speed. Traditional turbine or rotary style windmills create an amount of energy proportional to the area it covers when the blade rotates. This has presented problems for those conventional designs. In areas where wind energy is consistently higher traditional rotary style windmills can effective, however most geographic regions do not offer an ideal environment where wind energy is produced at a constant. These conventional rotary styles have difficulty when winds are below a certain speed. Furthermore, conventional rotary style windmills have inherent inefficiencies as during operation a backpressure of the rotary blades exists which drives the overall efficiency lower. The maximum efficiency of a conventional rotary windmill is approximately 44%.

Accordingly there is a need for a wind energy conversion system that utilizes an alternative construction to rotary style that increases the efficiency of the energy conversion and has the ability to accommodate a greater span of wind speeds and still effectively convert the wind energy.

SUMMARY OF THE INVENTION

It is the object of the present invention to provide a wind energy conversion system that utilizes reciprocating wind panels to produce mechanical or electrical energy.

Another object of the present invention is to provide a wind energy conversion system that converts a reciprocal movement to a rotational force that is utilized to drive a gear wheel.

A further object of the present invention is to provide a wind energy conversion system that includes a plurality of longitudinal members on the wind panels wherein the longitudinal members alternate between a first position and a second position to facilitate the reciprocal movement of the wind panels.

Still a further object of the present invention is to provide a wind energy system that further includes wind panel support rods operable to support the wind panels.

An additional object of the present invention is to provide a wind energy conversion system that includes a mast and support platform.

Still another object of the present invention is to provide a wind energy conversion system wherein the wind panel support rods are configured with members that alter the directional movement of the wind panel by changing the position of the longitudinal members so as to facilitate the movement of the wind panel in an opposite direction.

Yet a further object of the present invention is to provide a wind energy conversion system that includes a power rod, wherein the power rod is suspendedly engaged with the pivot bar and is operably coupled therewith.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
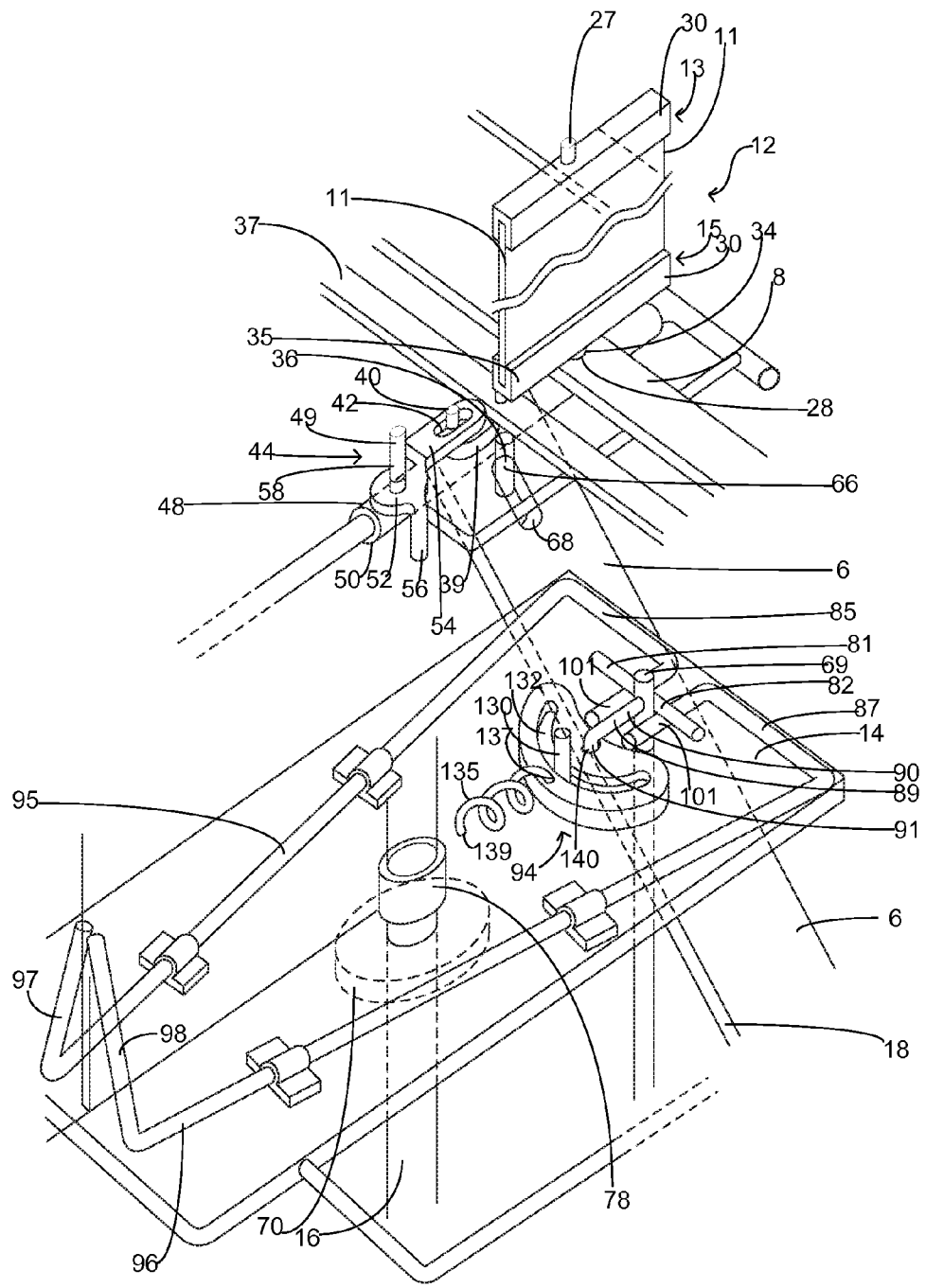
FIG. 1 is a detailed view of the wind panel and its components.

Referring now to the drawings submitted herewith, wherein various elements depicted therein are not necessarily drawn to scale and wherein through the views and figures like elements are referenced with identical reference numerals, there is illustrated a wind energy conversion system 100 constructed according to the principles of the present invention.

Figure 2:
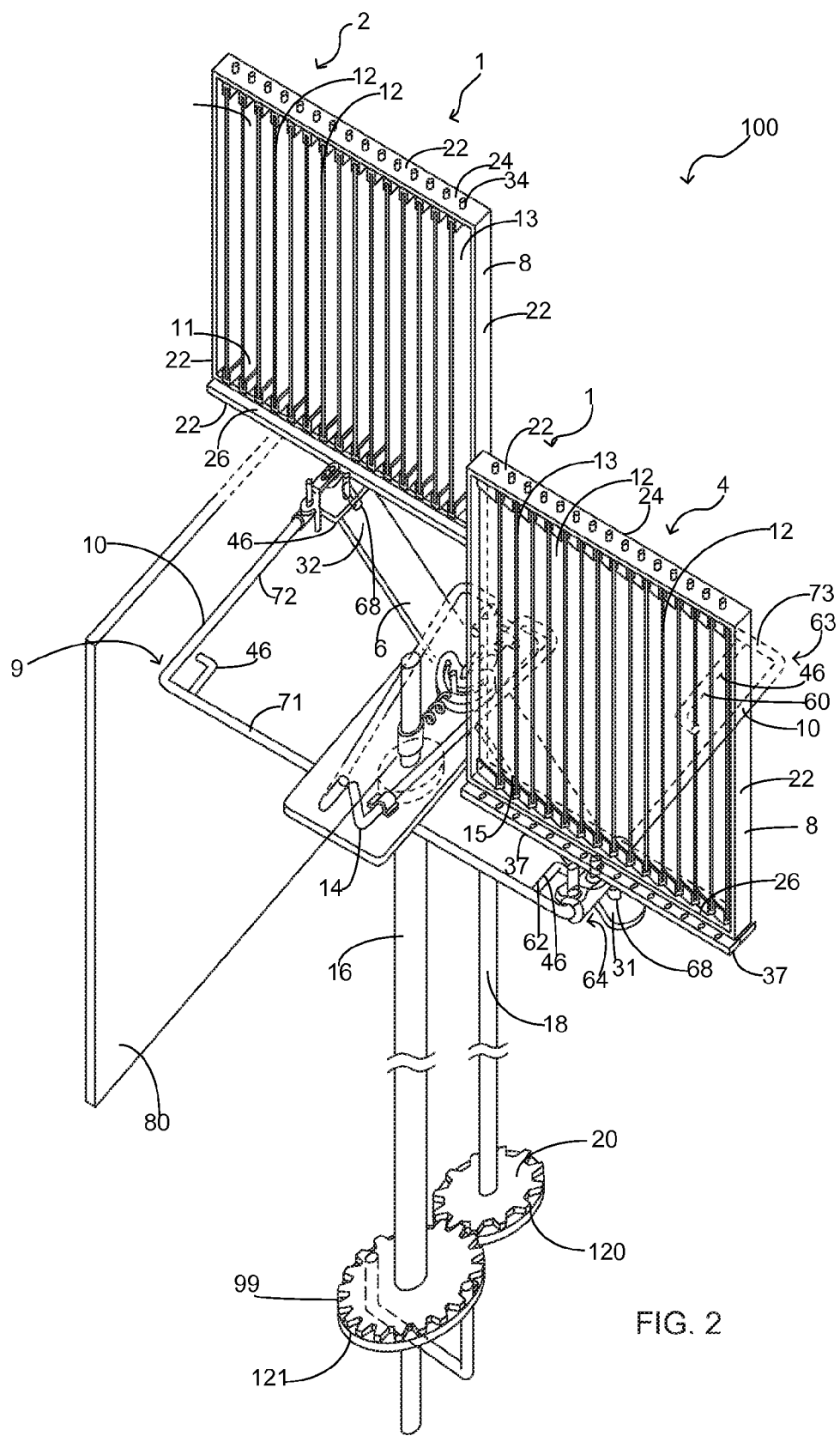
FIG. 2 is a perspective view of an embodiment of the present invention.

The wind energy conversion system 100 further includes a first wind panel 2 and a second wind panel 4. The first wind panel 2 and second wind panel 4 are operably coupled to a pivot bar 6 and function to move in a reciprocating manner. The wind panels 1 include peripheral frames 8 and are slidably mounted to support rods 10. The wind panels 1 include a plurality of longitudinal members 12 that are operable to be moved between a first position and a second position. The wind panels 1 and pivot bar 6 are operably engaged with a support platform 14 that is rotatably mounted on a support mast 16. A power rod 18 is operably coupled to the pivot bar 6 and extends through the support platform 14 and functions to transfer the reciprocating movement of the pivot bar 6 caused by the back and forth movement of the wind panels 1. The wind panels 1 traverse in a reciprocating manner driven by alternate positions of the longitudinal members 12 wherein the longitudinal members 12 on the first wind panel 2 are in a first position and the longitudinal members 12 on the second wind panel 4 are in a second position. By way of example, the longitudinal members 12 on the first wind panel 2 are in an open position, illustrated in FIG. 2 herein, and the longitudinal members 12 on the second wind panel 4 are in a closed position. The longitudinal members 12 on first wind panel 2 are in an open position as the wind panel 2 illustrated in FIG. 2 is illustrated such that the control pin 56 has not yet engaged the position rod 46 but is adjacent thereto. Subsequent the control pin 56 engaging the position rod 46 the longitudinal members 12 will transition to a closed position. The movement of the pivot bar 6 drives the power rod 18, which is operably coupled to gear 20. Gear 20 is operable to capture the power output of the wind energy conversion system 100 and operably couple to numerous electrical or mechanical systems for consumption of the power.

The wind panels 1 include a peripheral frame 8. The peripheral frame 8 is manufactured from four sections 22 that are generally equal in length being manufactured from a suitable durable material such as but not limited to metal. The four sections 22 are secured utilizing suitable durable techniques and it is contemplated within the scope of the present invention that while the four sections 22 are manufactured so as to create square shaped wind panels 1, the wind panels 1 could be manufactured in an alternative shape such as but not limited to a rectangle. The wind panels 1 include a plurality of longitudinal members 12 that are pivotally mounted intermediate the upper section 24 and lower section 26 of the peripheral frame 8. Secured to the first end 13 and second end 15 of the longitudinal members 12 are brackets 30. The brackets 30 are generally square u-shaped and are manufactured from a suitable durable material. The brackets 30 surroundably mount the first end 13 and second end 15 of the longitudinal members 12 and are secured thereto utilizing suitable durable techniques.

The longitudinal members 12 are generally elongated and rectangular in shape and are substantially planar in manner. The longitudinal members 12 are pivotally mounted intermediate the upper section 24 and lower section 26 utilizing pins 27,28. Pins 27, 28 are conventional mounting pins manufactured from a suitable material and are secured to the brackets 30 utilizing suitable techniques. Pins 27, 28 are journaled through apertures 34 in the upper section 24 and lower section 26 of the peripheral frame 8 of each wind panel 1. Extending downward from each bracket is rod 36. The rod 36 is secured to each bracket 30 utilizing suitable durable techniques and is secured proximate the second end 35 of the bracket 30. The rod 36 is operably coupled with the longitudinal member control bar 37. The longitudinal member control bar 37 is suspendedly secured by cotter pin or other conventional fastener to the rod 36. The longitudinal member control bar 37 functions to transition the longitudinal members 12 between their first position and second position. The transition of the longitudinal members 12 between their first position and their second position by the longitudinal member control bar 37 is accomplished by the lateral movement of the longitudinal member control bar 37. The longitudinal member control bar 37 is generally elongated and rectangular in shape and planar in manner. The longitudinal member control bar 37 is adjacent the lower section 26 and substantially parallel therewith.

As shown in particular in FIG. 1 the longitudinal member control bar 37 further includes a tab 39 that is integrally secured thereto proximate the midpoint of the longitudinal member control bar 37. The tab 39 extends in a planar manner away from the longitudinal members 12. The tab further includes coupling pin 40 that is secured thereto and oriented in a generally vertical manner. The coupling pin 40 is integrally formed with the tab and functions to engage the aperture 42 of the control mechanism 44. The control mechanism 44 functions to transition the longitudinal members 12 from a first position to a second position by engaging the position rods 46 that are secured to the support rods 10. As the control mechanism 44 engages the position rods 46 the control mechanism 44 is rotated and thus laterally moves the longitudinal member control bar 37 so as to change the position of the longitudinal members 12. The control mechanism 44 is rotatably mounted on the upper surface 48 of the support sleeve 50 via pin 49. The support sleeve 50 is a tubular shaped sleeve that is surroundably mounted to the support rod 10. The support sleeve 50 is additionally secured to the lower section 26 of the peripheral frame 8. The support sleeve 50 slidably traverses in a back-and-forth motion along the support rod 10 intermediate position rods 46 as the longitudinal members 12 alternate between their first and second position, which reverses the direction of travel for the wind panels 1.

The control mechanism 44 includes a body 52 that is generally modified circular in shape having integrally formed therewith bar 54 containing aperture 42. The bar 54 is integrally formed with the body 52 and is configured such that it is substantially a horizontal in manner. A control pin 56 extends downward from said body 52 and is integrally formed therewith. The control pin 56 extends downward and is of sufficient length so as to engage the position rods 46 mounted to the support rods 10. The control pin 56 is secured to the body 52 such that the control pin 56 is outward from the support sleeve 50 so as to allow proper movement thereof upon engaging the positions rods 46. The control mechanism 44 is rotatably mounted on rod 58. Rod 58 is superposed the support sleeve 50 and is secured utilizing suitable techniques. As the wind panels 1 traverse along the support rod 10, the control pin 56 will eventually engage the position rods 46. Mounted to each support rod 10 is a first position rod 60 and a second position rod 62. The first position rod 60 is proximate end 63 and the second position rod 62 is proximate end 64. The control pin 56 will contact either the first position rod 60 or the second position rod 62 depending on the location of the wind panel 1 wherein upon contacting either the first position rod 60 or second position rod 62 the control mechanism 44 will rotate and cause lateral movement to the longitudinal member control bar 37 thus altering the position of the longitudinal members 12. As the support sleeve 50 traverses along the support rod 10 the shaft 66 moves the pivot bar 6 in the direction in which the wind panel 1 is traveling. The shaft 66 is secured utilizing suitable techniques to the bottom surface of the bracket 30. The shaft 66 extends in a generally downward direction and is at least partially journaled through slot 68 and transfers the movement of the wind panels 1 to the pivot bar 6. The slot 68 is generally elongated and oval in shape so as to allow the shaft 66 sufficient space to traverse within the slot 68 before the pivot bar 6 changes direction as a result of the longitudinal members 12 altering positions. It is contemplated within the scope of the present invention that the pivot bar 6 and support sleeve 50 could be operably coupled utilizing numerous types of suitable mechanical connections.

The pivotal mounting of the longitudinal members 12 allows the longitudinal members 12 to be transitioned from a first position to a second position. In the first position, the edges 11 of the longitudinal members 12 are positioned such that they are generally overlapping the edge 11 of the adjacent longitudinal member 12. As shown in particular in FIG. 2, in the first position, the longitudinal members 12 are positioned such that the first wind panel 2 is in a closed position. In this first position the first wind panel 2 does not allow the wind to pass through the longitudinal members 12 and as a result the force of the wind traverses the wind panel 2 in a direction towards the second end 9 of the support rod 10. Throughout the directional movement of the first wind panel 2, the support sleeve 50 slidably traverses along the support rod 10. As the support sleeve 50 slidably traverses along the support rod 10 the shaft 66 moves the pivot bar 6, which subsequently rotates the power rod 18. During the period in which the longitudinal members 12 of the first wind panel 2 are in a first position, the longitudinal members 12 of the second wind panel 4 are in the second position. As shown in FIG. 2, the longitudinal members 12 of the second wind panel 4 are positioned such that the longitudinal members 12 are substantially parallel creating a void 7 intermediate each longitudinal member 12. In this position the second wind panel 4 has substantially reduced wind resistance as compared to the first wind panel 2. As the first wind panel 2 and second wind panel 4 are operably coupled utilizing pivot bar 6, the second wind panel 4 traverses along support rod 10 towards end 5. As the longitudinal members 12 of the first wind panel 2 and second wind panel 4 alternate between their first position and their second position, the first wind panel 2 and second wind panel 4 reciprocate in a back-and-forth motion and subsequently drive the pivot bar 6 in a similar pattern.

The pivot bar 6 is generally elongated in shape and planar in manner being manufactured from a suitable durable material such as but not limited to metal. The pivot bar 6 is operably coupled to the power rod 18 and is positioned in a substantially horizontal manner. The pivot bar 6 includes ends 31,32 being distal to each other and slots 68. As previously discussed herein slot 68 functions to engage shaft 66. Two slots 68 are present being distally located from each other such that a slot 68 is proximate end 31 and 32. The pivot bar 6 is mounted to power rod 18 and is immediately underneath the support platform 14. The power rod 18 is journaled through both the support platform 14 and the pivot bar 6 proximate end 69. End 69 of power rod 18 is generally d-shaped. The power rod 18 is d-shaped only proximate end 69. The d-shaped portion of the power rod 18 facilitates the transfer of the pivoting motion of the pivot bar 6 to the power rod 18 as the shape facilitates an operable and generally slip resistant connection. The power rod 18 is only d-shaped proximate end 69 and is generally cylindrical in shape for the length of the power rod 18 towards gear 20.

The support platform 14 is generally rectangular in shape and planar in manner. The support platform 14 is manufactured from a suitable durable material such as but not limited to metal. It is contemplated within the scope of the present invention that the support platform could be formed in numerous different shapes and sizes and accomplish the desired functionality as described herein. The support platform 14 is rotatably mounted to support mast 16. A support ring 70 functions to secure the support platform 14 to the support mast 16. The support ring 70 is manufactured from a suitable durable material and is surroundably mounted to the support mast 16. The support ring 70 is secured to the support mast 16 utilizing suitable mechanical techniques and is of sufficient size so as to provide proper support for the support platform 14. Those skilled in the art will recognize that the support platform 14 could be mounted to the support mast 16 utilizing numerous different techniques and/or fasteners. As previously discussed herein, the support platform 14 has secured thereto support rod 10. The support platform 14 is rotatable about the support mast 16 so as to position the wind energy conversion system 100 in the proper orientation to allow the wind panels 1 to face the wind having the directional vane 80 generally downwind therefrom. Secured to the support mast 16 is the directional vane 80. The directional vane 80 is independently rotatably secured to the support mast 16 with sleeve 78. The directional vane 80 is generally rectangular in shape and planar in manner. The directional vane 80 functions to orient the wind energy conversion system 100 such that the wind panels 1 are generally facing the wind. Those skilled in the art will recognize that the directional vane 80 could be manufactured in numerous different sizes and shapes in order to achieve the desired functionality described herein.

Support rod 10 includes a first portion 71, second portion 72 and third portion 73. The first portion 71 is secured to the bottom surface of the support platform 14 utilizing conventional durable techniques. The second portion 72 and third portion 73 are contiguous with the first portion 71 on opposing ends 74,75. Second portion 72 and third portion 73 are generally perpendicular to first portion 71. The support rod 10 is a rigid material that is generally tubular in shape. The second portion 72 and third portion 73 provide support for the wind panels 1 and are operably coupled therewith via the support sleeves 50. The second portion 72 and third portion 73 of the support rods 10 are mounted parallel with the support platform 14 so as to facilitate unrestricted movement as the pivot bar 6 is reciprocated as a result of being operably engaged with shaft 66.

As shown in particular in FIG. 1, the power rod 18 includes a first lateral arm 81 and a second lateral arm 82 proximate end 69. The first lateral arm 81 and second lateral arm 82 are secured opposedly on the power rod 18 and extend outward therefrom. The first lateral arm 81 and second lateral arm 82 are generally rod shaped and are manufactured from a suitable durable material being secured to the end 69 of the power rod 18 utilizing suitable techniques. The first lateral arm 81 and second lateral arm 82 superpose the first gear rod 85 and second gear rod 87 respectively. The power rod 18 further includes mounted thereto proximate end 69 and circumferentially intermediate the first lateral arm 81 and second lateral arm a gear engagement pin 90. The gear engagement pin 90 extends outward from the power rod 18 and includes end 91 that is contiguous with body 89 wherein the end 91 is oriented in a downward direction being generally perpendicular to the body 89. The gear engagement pin 90 functions to operably connect the power rod 18 to the gear drive mechanism 94. As shown in particular in FIG. 1, in its first position the gear engagement pin 90 is operably coupled with the gear drive mechanism 94. In its first position, the gear engagement pin 90 allows the reciprocating movement of the pivot bar 6 to be transferred to gear 20. The first gear lever 95 and second gear lever 96 function to lift the gear engagement pin 90 into its second position wherein end 91 of the gear engagement pin 90 is no longer operably coupled to the gear drive mechanism 94. In this second position, the support platform 14 and the components operably coupled thereto can rotate about the support mast 16 so as to be oriented in the correct direction with respect to the wind, i.e. the wind panels 1 are generally square into the wind with the directional vane 80 being downwind of the wind panels 1. During this positional adjustment, gear 20 and gear 99 are not operably coupled. First gear lever 95 and second gear lever 96 are rods movably mounted to the support platform 14 having ends 97,98 biased against the directional vane 80. As the directional vane 80 is moved laterally by the force of the wind, either end 97 or 98 is moved in an outward direction. As ends 97 or 98 are moved in an outward direction, the shape of the first gear lever 95 and second gear lever 96 is such that the ends 101 will be moved in an upwards direction. This upward force from ends 101 will be applied to either the first lateral arm 81 or the second lateral arm 82 thereby lifting the power rod 18 such that the gear engagement pin 90 is no longer operably coupled to the gear drive mechanism 94. As the lifting of the power rod 18 occurs, the teeth 120 of gear 20 are raised such that they no longer engage the grooves 121 of gear 99. As previously mentioned, this permits the wind energy conversion system 100 to rotate so as to position in a direction wherein the wind panels 1 are generally facing the wind with the directional vane 80 being downwind thereof. Subsequent the wind energy conversion system 100 reaching the aforementioned position. The weight of the power rod 18 will cause the gear engagement pin 90 to re-couple with the gear drive mechanism 94 and the teeth 120 of gear 20 will be operably engaged with grooves 121 of gear 99.

The gear drive mechanism 94 is movably mounted to the support platform 14 with pin 130. The gear drive mechanism 94 is manufactured from a suitable durable material and is generally crescent shaped having a channel 132. The channel 132 is arcuate in shape and functions to allow the gear drive mechanism to traverse in an arcuate pattern along pin 130. The shape of the channel 132 is required so as to provide minimal resistance with the reciprocating motion of the pivot bar 6. Secured to gear drive mechanism 94 is spring 135. Spring 135 is a conventional resilient spring having a first end 137 and a second end 139. The spring 135 functions to biasly position the gear drive mechanism 94 such that the end 91 of the gear engagement pin 90 will align with aperture 140 and be journaled therein. While the gear drive mechanism 94 has been described herein in a preferred embodiment, it is contemplated within the scope of the present invention that the gear drive mechanism 94 could be formed in numerous different shapes and achieve the desired functionality as described herein.

While not particularly illustrated herein, it is contemplated within the scope of the present invention that the gear drive mechanism 94 is locked into place as end 91 is removed from aperture 140. While numerous techniques could be employed to lock the gear drive mechanism 94 in place good results have been achieved utilizing a return spring and a biased pin mounted underneath support platform 14 wherein the return spring traverses the gear drive mechanism to its central position and the biased pin journals into aperture 140 from the opposing side of end 91. As the end 91 is realigned with aperture 140 end 91 journals into aperture 140 with the weight of the power rod 18 being sufficient to remove the biased pin from the opposing end of the aperture 140. The biased pin does not engage the gear drive mechanism 94 during movement thereof and will only engage subsequent the upward movement of end 91 of the gear engagement pin 90.

As described herein, the power rod 18 is rotatably moved by the reciprocal movement of the pivot bar 6. This rotational movement is transferred to gear 20 which is additionally operably coupled to gear 99. It is contemplated within the scope of the present invention that the movement of the power rod 18 could be transferred to the gear 20 such that the gear 20 rotates in a clockwise/counterclockwise motion or wherein through the utilization of additional conventional gears is rotated in either a clockwise or counterclockwise direction. It is further contemplated within the scope of the present invention that the gear 20 could be operably coupled with numerous types of devices such as but not limited to an electrical generator or mechanically powered device.

Referring to the drawings submitted herewith, a description of the operation of the wind energy conversion system 100 is as follows. In use, the wind energy conversion system 100 is mounted in a desired location utilizing the support mast 16. As a stream of air passes the directional vane 80, the directional vane 80 positions the wind energy conversion system 100 such that the wind panels 1 and generally windward thereof an square into the wind. As the directional vane 80 orients the wind energy conversion system 100, the first gear rod 85 or second gear rod 87 engage a side of the directional vane 80. The lateral movement of the directional vane 80 lifts the power rod 18 such that the gear engagement pin 90 is temporarily decoupled from the gear drive mechanism 94. This is accomplished by the lateral movement of the directional vane 80 being transferred to through either the first gear rod 85 or second gear rod 87 such that either the first gear rod 85 or second gear rod 87 pushes the first lateral arm 81 or second lateral arm 82 upward. This allows the support platform 14 to rotate about the support mast 16. Once the power rod 18 recedes downward such that the gear engagement pin 90 is coupled with the gear drive mechanism 94, the movement of the wind panels 1 is transferred to the gear 20 and gear 99. The first wind panel 2 and second wind panel 4 are in opposing positions at all times such that the longitudinal members 12 of the first wind panel 2 and the longitudinal members 12 of the second wind panel 4 are alternately in the open or closed position. As the longitudinal members 12 are in opposed positions, the wind panels 1 begin to reciprocate. As the wind panels 1 reciprocate the operably coupled pivot bar 6 transfers the motion to the power rod 18. As described herein the control mechanism will alter the position of the longitudinal members 12 such that the longitudinal members 12 will drive the wind panels 1 in a back and forth motion with the pivot bar 6 transferring the motion to the power rod 18. It is further contemplated within the scope of the present invention that more than two wind panels 1 could be utilized in order to accomplish the desired movement of the pivot bar 6 as described herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A wind energy conversion system comprising:
   at least two wind panels, said at least two wind panels having a peripheral frame, said peripheral frame including an upper portion and a lower portion, said at least two wind panels including a plurality of longitudinal members, said plurality of longitudinal members being rectangular in shape and planar in manner, said plurality of longitudinal members being pivotally mounted intermediate said upper portion and said lower portion of said peripheral frame, said plurality of longitudinal members having a first position and a second position;
   a support platform, said support platform being rectangular in shape, said support platform further including support rods, said support rods extending outward from opposing sides of said support platform, said support rods including a portion that is substantially parallel with said opposing sides of said support platform, said support rods configured to be operably engaged with said at least two wind panels,
   a mounting bar, said mounting bar having a first end and a second end, said mounting bar being positioned underneath said support platform, said mounting bar being operably engaged with said at least two wind panels, said at least two wind panels operably engaged with said first end and said second end of said mounting bar, said mounting bar operable to move in a reciprocating manner;

a power rod, said power rod being operably coupled with said support platform and said mounting bar, said power rod having a first end and a second end, said power rod being journaled through said support platform and said mounting bar, said power rod being suspendedly engaged therewith, said first end of said power rod extending above said support platform, said second end of said power rod being beneath said mounting bar and extending downward therefrom, said second end of said power rod further including a gear operably coupled therewith;

a control mechanism, said control mechanism operable to transition said plurality of longitudinal members between said first position and said second position;

wherein said plurality of longitudinal members of said at least two wind panels alternate between said first position and said second position so as to drive the mounting bar in a reciprocating manner subsequently providing rotational movement of said power rod.

2. The wind energy conversion system as recited in claim 1, and further including a support mast, said support mast being elongated and cylindrical in shape, said support mast being journaled through said support platform, said support mast operable to have said support platform mounted thereto.

3. The wind energy conversion system as recited in claim 2, and further including a directional vane, said directional vane operably coupled with said support mast, said directional vane operable to orient the wind energy conversion system.

4. The wind energy conversion system as recited in claim 3, and further including a first gear engagement rod and second gear engagement rod, said first gear engagement rod and said second gear engagement rod being superposed said support platform, said first gear engagement rod and said second gear engagement rod having a first end and a second end, said first end of said first gear engagement rod and said second gear engagement rod being proximate said first end of said power rod, said second end of said first gear engagement rod and said second gear engagement rod being biased against opposing sides of said directional vane.

5. The wind energy conversion system as recited in claim 4, and further including a longitudinal member control bar, said longitudinal member control bar operably engaged with said plurality of longitudinal members, said longitudinal member control bar further being operably coupled with said control mechanism, said longitudinal member control bar operable to transition said plurality of longitudinal members between said first position and said second position.

6. The wind energy conversion system as recited in claim 5, and further including a first lateral arm and a second lateral arm, said first lateral arm and said second lateral arm being secured to said first end of said power rod, said first lateral arm and said second lateral arm opposedly extending from said first end of said power rod, said first lateral arm and said second lateral arm being superposed said first gear engagement rod and said second gear engagement rod.

7. The wind energy conversion system as recited in claim 6, and further including directional rods, said directional rods being secured to said support rods, said directional rods operable to engage said control mechanism, said directional rods operable to move said control mechanism so as to transition said plurality of longitudinal members between said first position and said second position, said directional rods operable to place said plurality of said at least two wind panels such that said plurality of longitudinal members are in alternate positions so as to facilitate the reciprocal motion of said at least two wind panels.

8. A wind energy conversion system that utilizes a reciprocal motion of two wind panels to convert wind energy into an alternative form of energy comprising:

a first wind panel and a second wind panel, said first wind panel and said second wind panel being square in shape, said first wind panel and said second wind panel further including a peripheral frame, said peripheral frame being substantially rigid having an upper portion and a lower portion, said first wind panel and said second wind panel including a plurality of longitudinal members, said plurality of longitudinal members being elongated and rectangular in shape having opposing lateral edges, said plurality of longitudinal members being planar in manner, said plurality of longitudinal members being pivotally mounted intermediate said upper portion and said lower portion of said peripheral frame, said plurality of longitudinal members having a first position and a second position, wherein in said first position said plurality of longitudinal members are positioned such that the lateral edges are overlapping so as to prevent air passing between said plurality of longitudinal members, wherein in said second position said plurality of longitudinal members being positioned such that a void is present intermediate each adjacent longitudinal member said so as to allow air to pass therethrough;

a support platform, said support platform being rectangular in shape and planar in manner, said support platform having a first side and a second side, said support platform having a first end and a second end, said support platform further including a first lateral support rod and a second lateral support rod, said first lateral support rod extending outward from said first side of said support platform, said second lateral support rod extending outward from said second side of said support platform, said first lateral support rod and said second lateral support rod including linear portion that is parallel with said first side and said second side of said support platform respectively, said first lateral support rod operable to provide support for and be operably engaged with said first wind panel, said second lateral support rod operable to provide support for and be operably engaged with said second wind panel;

a first control mechanism and a second control mechanism, said first control mechanism and said second control mechanism operably coupled with said plurality of longitudinal members of said first panel and said second panel respectively, said first control mechanism and said second control mechanism being operable to transition said plurality of longitudinal members between said first position and said second position, said first control mechanism and said second control mechanism operable to engage a portion of said first lateral support rod and said second lateral support rod so as to facilitate the transition between said first position and said second position of said plurality of longitudinal members;

a power rod, said power rod being journaled through said support platform proximate said first end, said power rod having a first end and a second end, said power rod being suspendedly engaged with said support platform, said power rod having a first end and a second end, said power rod elongated and cylindrical in shape, said power rod being d-shaped proximate said first end, said power rod further including a gear operably coupled to said second end;

a support mast, said support mast, said support mast being journaled through said support platform proximate said second end, said support mast being elongated and cylindrical in shape, said support mast further including a support ring, said support ring operable to provide support for said support platform;

a pivot bar, said pivot bar being mounted underneath said support platform, said pivot bar being operably engaged with said power rod proximate said first end of said power rod, said pivot bar being elongated and rectangular in shape and substantially planar in manner, said pivot bar having a first end and a second end, said first end of said pivot bar being operably engaged with said first wind panel, said second end of said pivot bar being operably engaged with said second end of said pivot bar, said pivot bar operable to be move in a reciprocating manner by said first wind panel and said second wind panel.

9. The wind energy conversion system as recited in claim 8, and further including a first support sleeve and a second support sleeve, said first support sleeve being surroundably mounted to said first lateral rod and slidably engaged therewith, said second support sleeve being surroundably mounted to said second lateral rod and slidably engaged therewith, said first support sleeve operably connected to said first wind panel, said second support sleeve operably engaged with said second wind panel.

10. The wind energy conversion system as recited in claim 9, and further including a first longitudinal member control bar and a second longitudinal member control bar, said first longitudinal member control bar being operably engaged with said plurality of longitudinal members of said first wind panel, said second longitudinal member control bar being operably engaged with said plurality of longitudinal members of said second wind panel, said first longitudinal member control bar and said second longitudinal member control bar operable to transition said plurality of longitudinal members of said first wind panel and said second wind panel between said first position and said second position.

11. The wind energy conversion system as recited in claim 10, wherein said first control mechanism and said second control mechanism is rotatably mounted to said first support sleeve and said second support sleeve respectively, said first control mechanism and said second control mechanism further including a keeper, said keeper operable to engage with a pin on said first longitudinal member control bar and said second longitudinal member control bar respectively, said first control mechanism and said second control mechanism further including a downwardly extending portion, said downwardly extending portion of said first control mechanism operable to engage at least a portion of said first lateral support rod, said downwardly extending portion of said second control mechanism operable to engage at least a portion of said second lateral support rod.

12. The wind energy conversion system as recited in claim 11, and further including a directional vane, said directional vane being mounted to said support mast and superposed said support platform, said directional vane being rectangular in shape and planar in manner, said directional vane having a first side and a second side.

13. The wind energy conversion system as recited in claim 12, wherein said power rod further includes a first lateral arm and a second lateral arm, said first lateral arm and said second lateral arm being mounted proximate said first end of said power rod, said first lateral arm and said second lateral arm extending outward from said first end of said power rod in opposing directions, said first end of said power rod further including a gear engagement pin, said gear engagement pin being circumferentially intermediate said first lateral arm and said second lateral arm, said gear engagement pin extending outward from said first end of said power rod, said gear engagement pin operable to engage a gear drive mechanism.

14. The wind energy conversion system as recited in claim 13, and further including a first gear engagement lever and a second gear engagement lever, said first gear engagement lever having a first end and a second end, said first gear engagement lever being operably engaged with said first lateral arm proximate said first end, said first gear engagement lever being operably engaged with said first side of said directional vane, said second gear engagement lever being having a first end and a second end, said second gear engagement lever being operably engaged with said second lateral arm proximate said first end, said second end of said second gear engagement lever being engaged with said second side of said directional vane, said first gear engagement lever and said second gear engagement lever being operable to disengage said gear engagement pin from said gear drive mechanism subsequent lateral movement of said directional vane.

15. A wind energy conversion system operable to utilize a reciprocating movement to convert wind energy into mechanical or electrical energy comprising:

a first wind panel and a second wind panel, said first wind panel and said second wind panel being square in shape, said first wind panel and said second wind panel further including a peripheral frame, said peripheral frame being substantially rigid having an upper portion and a lower portion, said first wind panel and said second wind panel including a plurality of shutters, said plurality of shutters being elongated and rectangular in shape having a first lateral edge and a second lateral edge, said plurality of shutters being planar in manner, said plurality of shutters having a first end and a second end, said plurality of shutters having an upper bracket and a lower bracket surroundably mounted to said first end and said second end respectively, said upper bracket and said lower bracket further including a mounting pin, said mounting pin of said upper bracket and said lower bracket operable to couple with said upper portion and said lower portion of said peripheral frame, said mounting pin of said upper bracket and said lower bracket operable to provide a rotational connection between said plurality of shutters and said peripheral frame so as to facilitate a first position and a second position of said plurality of shutters, wherein in said first position said plurality of shutters are positioned such that the lateral edges are overlapping so as to prevent air passing between said plurality of shutters, wherein in said second position said plurality of shutters being positioned such that a void is present intermediate each adjacent shutter said so as to allow air to pass therethrough, said lower bracket of said plurality of shutters further including a shaft, said shaft extending downward from said lower bracket, said shaft being proximate said first lateral edge of said plurality of shutters;

a support platform, said support platform being rectangular in shape and planar in manner, said support platform having a first side and a second side, said support platform having a first end and a second end, said support platform further including a first lateral support rod and a second lateral support rod, said first lateral support rod having a first portion, a second portion and a third portion being contiguous, said first portion of said first lateral support rod extending outward from said first side of said support platform, said second portion of said first lateral support rod being perpendicular with said first portion, said second portion of said first lateral support rod being parallel with said first side of said support platform, said third portion of said first lateral support arm being perpendicular with said second portion, said third portion of said first lateral support arm extending inward towards said first side of said support platform, said second lateral support rod having a first portion, a second portion and a third portion being contiguous, said first portion of said second lateral support rod extending outward from said second side of said support platform, said second portion of said second lateral support rod being perpendicular with said first portion, said second portion of said second lateral support rod being parallel with said second side of said support platform, said third portion of said second lateral support arm being perpendicular with said second portion, said third portion of said second lateral support arm extending inward towards said second side of said support platform, said first lateral support rod operable to provide support for and be operably engaged with said first wind panel, said second lateral support rod operable to provide support for and be operably engaged with said second wind panel;

a first support sleeve and a second support sleeve, said first support sleeve being surroundably mounted to said second portion of said first lateral rod and slidably engaged therewith, said second support sleeve being surroundably mounted to said second portion of said second lateral rod and slidably engaged therewith, said first support sleeve operably connected to said first wind panel, said second support sleeve operably engaged with said second wind panel;

a first control mechanism and a second control mechanism, said first control mechanism and said second control mechanism rotatably mounted on said first support sleeve and said second support sleeve respectively, said first control mechanism and said second control mechanism having a central body being annular in shape, said first control mechanism and said second control mechanism further including a strike pin, said strike pin extending downward from said central body and being integrally formed therewith, said first control mechanism and said second control mechanism further including a keeper said keeper being mounted on an upper surface of said central body, said keeper being mounted perpendicular to said strike pin, said first control mechanism an said second control mechanism operably coupled with said plurality of shutters of said first panel and said second panel respectively, said first control mechanism and said second control mechanism being operable to transition said plurality of shutters between said first position and said second position;

a power rod, said power rod being journaled through said support platform proximate said first end, said power rod having a first end and a second end, said power rod being suspendedly engaged with said support platform, said power rod having a first end and a second end, said power rod elongated and cylindrical in shape, said power rod being d-shaped proximate said first end, said power rod further including a gear operably coupled to said second end;

a support mast, said support mast, said support mast being journaled through said support platform proximate said second end, said support mast being elongated and cylindrical in shape, said support mast further including a support ring, said support ring operable to provide support for said support platform;

a pivot bar, said pivot bar being mounted underneath said support platform, said pivot bar being operably engaged with said power rod proximate said first end of said power rod, said pivot bar being elongated and rectangular in shape and substantially planar in manner, said pivot bar having a first end and a second end, said first end of said pivot bar being operably engaged with said first wind panel, said second end of said pivot bar being operably engaged with said second end of said pivot bar, said pivot bar operable to be moved in a reciprocating manner by said first wind panel and said second wind panel;

a first shutter control bar and a second shutter control bar, said first shutter control bar being operably engaged with said shaft of said lower bracket of said plurality of shutters of said first wind panel, said second shutter control bar being operably engaged with said shaft of said lower bracket of said plurality of shutters of said second wind panel, said first shutter control bar and said second control bar operable to transition said plurality of longitudinal members of said first wind panel and said second wind panel between said first position and said second position; and wherein said power rod is driven in a rotational manner by the reciprocating of the pivot bar as a result of said plurality of shutters of first wind panel and said second wind panel being in said cyclically transitioned between said first position and said second position wherein said plurality of shutters of said first wind panel and said plurality of shutters for said second wind panel are always in opposite positions simultaneously.

16. The wind energy conversion system as recited in claim 15, and further including a directional vane, said directional vane being mounted to said support mast and superposed said support platform, said directional vane being rectangular in shape and planar in manner, said directional vane having a first side and a second side, said directional vane operable to orient the wind energy conversion system such that said first wind panel and said second wind panel are facing the wind.

17. The wind energy conversion system as recited in claim 16, wherein said power rod further includes a first lateral arm and a second lateral arm, said first lateral arm and said second lateral arm being mounted proximate said first end of said power rod, said first lateral arm and said second lateral arm extending outward from said first end of said power rod in opposing directions, said first end of said power rod further including a gear engagement pin, said gear engagement pin being circumferentially intermediate said first lateral arm and said second lateral arm, said gear engagement pin extending outward from said first end of said power rod, said gear engagement pin operable to engage a gear drive mechanism.

18. The wind energy conversion system as recited in claim 17, and further including a first gear engagement lever and a second gear engagement lever, said first gear engagement lever having a first end and a second end, said first gear engagement lever being operably engaged with said first lateral arm proximate said first end, said first gear engagement lever being operably engaged with said first side of said directional vane, said second gear engagement lever being having a first end and a second end, said second gear engagement lever being operably engaged with said second lateral arm proximate said first end, said second end of said second gear engagement lever being engaged with said second side of said directional vane, said first gear engagement lever and said second gear engagement lever being operable to disengage said gear engagement pin from said gear drive mechanism subsequent lateral movement of said directional vane so as to allow rotation of the wind energy conversion system about the support mast.

19. The wind energy conversion system as recited in claim 18, wherein said gear drive mechanism is superposed said support platform proximate said first end of said support rod, said gear drive mechanism being semi-circular in shape having a concave edge, said gear drive mechanism having a semi-annular channel, said semi annular channel operable to engage a support pin extending from said support platform, said gear drive mechanism operably coupled with said gear engagement pin.

20. The wind energy conversion system as recited in claim 19, and further including directional rods, said directional rods being secured to said first portions and said third portions of said first lateral support rod and said second lateral support rod, said directional rods being parallel and adjacent said second portions, said directional rods operable to engage said strike pins of said first control mechanism and said second control mechanism, said directional rods operable to engage said strike pins so as to alter the position of said plurality of shutters of said first wind panel and said second wind panel.

* * * * *